May 9, 1950
E. A. F. PRESSER
2,506,891
COMBINED BEARING AND LUBRICATED
SELF-ALIGNED STUFFING BOX
Filed April 20, 1945
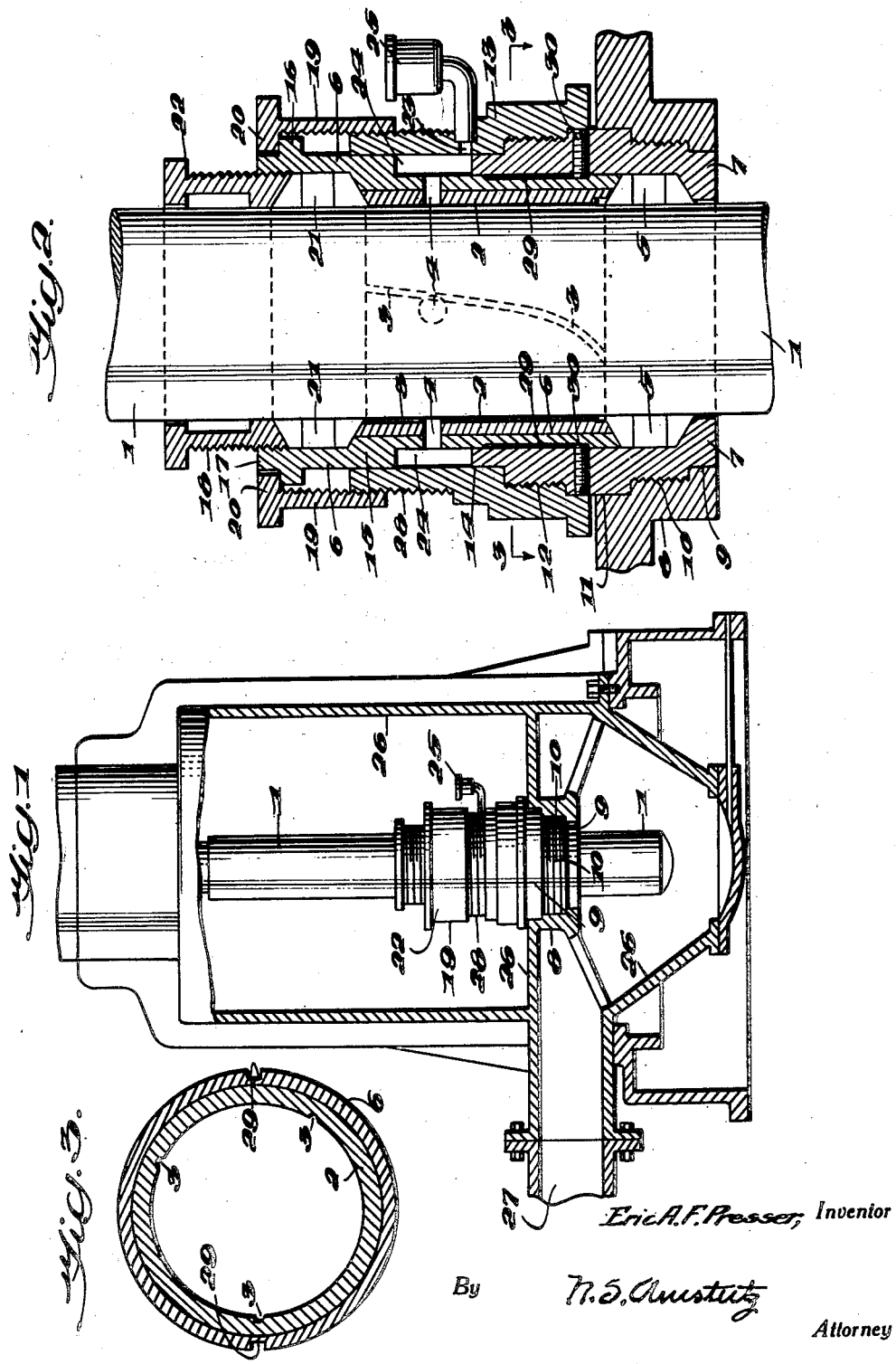
Eric A. F. Presser, Inventor
By N. S. Amstutz
Attorney Patented May 9, 1950

2,506,891

UNITED STATES PATENT OFFICE 2,506,891

COMBINED BEARING AND LUBRICATED SELF-ALIGNED STUFFING BOX

Eric A. F. Presser, East Chicago, Ind.

Application April 20, 1945, Serial No. 589,347

6 Claims. (Cl. 308—36.1)

My invention relates to improvements in combined bearing and lubricated self-aligned stuffing boxes and it more especially comprises the structure pointed out in the annexed claims.

The purpose of my invention is to provide a stuffing box on each side of a bearing; that such stuffing boxes are adjustable independently of each other; that provides lubrication for a bearing and the stuffing boxes; and that among other uses is adapted to serve single acting pumps handling certain chemicals or for any other pump adaptation using any kind of reciprocating or rotary shaft where there must be no leakage of lubricant beyond the stuffing boxes to contaminate any material that is being acted on.

With these and other ends in view I illustrate in the accompanying drawing such instances of adaptation as will show the broad principles of the invention without limiting myself to the specific details shown therein and described herein.

Fig. 1 is a reduced scale elevation showing the stuffing boxes applied to a single acting pump with continuous lubrication.

Fig. 2 is a longitudinal elevation in section of the bearing portion of Fig. 1.

Fig. 3 is a cross section on line 3—3 of Fig. 2, showing only two members.

In the practical adaption of my invention I may use whatever changes in structure that the exigencies of various conditions may demand without departing from the broad scope of the invention.

A shaft 1 is surrounded by a bearing of phosphor bronze 2 or any other desired material. It is provided with oil grooves 3 and oil openings 4. There is a stuffing area 5 which may contain any desired form of packing to meet the exact requirements of ordinary or special kinds of liquids that are to be handled. The packing in the area 5 is compressed as needed by a long tubular gland 6.

A very important feature of my invention is the preservation of the alignment of all the interacting parts. To this end the long aligning tube 7 is provided. The gland 6 contains the bearing 2 which may be pressed into place. It moves lengthwise of the shaft as the gland is adjusted. It is held against rotation by the pins 30 which enter the grooves 29 in the gland 6.

The upper stuffing box area 21 has a short gland 22. The upper end of this part of the packing area is formed by the upper end of the bearing 2 and a part of the enlarged diameter 15.

The aligning tube 7 has a threaded lower end 10 which engages the threaded portion of the housing 8. The aligning portion 11 enters the outer aligning sleeve 13. The upper end of the part 7 is threaded at 12 into the internal threads of the sleeve 13. The sleeve 13 has a long aligning portion 14. The extension of the lower gland 6 is indicated by the numeral 17. It has threads 18 into which the upper stuffing box gland 22 enters. The adjustment of this gland is independent of the adjustment of the lower gland 6, but an adjustment of the lower gland by means of the sleeve 19 at the same time moves the upper gland endwise without making any adjustment of it. This is done by turning the sleeve 19 on the threads 28 of the outer aligning sleeve 13.

There is a side oil inlet 23 supplied by an oil cup 25. The inlet 23 supplies the oil chamber 24. In Fig. 1 a conventional single stroke plunger pump is shown. It has a casing 26 that is provided with an outlet 27 and a cooperating inlet.

In Fig. 1 the structure is shown in a vertical relation and in Fig. 2 it is also shown in a vertical relation. While I have shown the lubricated stuffing boxes 5 and 21 in an exclusive vertical relation on a reciprocating plunger 1 it is of course understood that under other conditions the combined bearing and duplex stuffing boxes may be employed on shafts or plungers 1 acting horizontally.

Double stuffing boxes are also shown in my copending application Serial No. 534,173, filed May 4, 1944, and now abandoned, of which this is an improvement. The invention is not limited to reciprocating shafts for it is equally applicable in connection with rotating shafts.

The invention is equally adaptable for hydraulic cylinders, refrigerating compressors, single acting pumps as shown in Fig. 1 or double acting pumps, special hydraulic pumps for handling difficult materials and all water pumps.

The unusual feature of my invention is the combination of a bearing with a stuffing box at each end of the bearing and lubricating both the bearing and the stuffing boxes at the same time. In addition the invention provides self aligning surfaces which maintain alignment of the intermoving parts without placing any dependence whatever on the threaded portions of the adjustable members.

Another important feature of my invention is the fact that the entire assembly is removable from the support 8 as a unit and it may be slid to an end of the shaft 1 for removal in its entirety. The fact that the structure in its entirety is a complete unit lends itself to mass production on the assembly line. The structure eliminates the need for critical external alignment of separate stuffing boxes and associated bearings. In short, the device comprises a shaft bearing and a stuffing box at each end of the bearing. All the related members are in perfect concentric relation to the center of the shaft and they constitute a pre-fabricated self-aligning unit.

In the role of efficiency, stuffing boxes that are lubricated do not needlessly consume energy as is common with dry boxes and the life of the interworking parts is very much prolonged and a plain phosphor bronze bushing may be replaced by a conventional needle or roller bearing.

The purpose of my invention is to provide a stuffing box on each side of a bearing; that such stuffing boxes are adjustable independently of each other; that provides lubrication for a bearing and the stuffing boxes; and that among other uses is adapted to serve single acting pumps handling certain chemicals or for any other pump adaptation using any kind of reciprocating or rotary shaft where there must be no leakage of lubricant beyond the stuffing boxes to contaminate any material that is being acted on.

What I claim is:

1. An independent assembly comprising a supporting housing and parallel aligning sleeves, two stuffing boxes within the sleeves adjustable independently of each other from the same end of the assembly, a removable bearing positioned throughout its length between the stuffing boxes by gland members exterior of it, a rotatable shaft passing through the stuffing boxes and the bearing, means for maintaining all the associated parts in parallel, concentric alignment with the shaft, means for adjusting the stuffing box glands from the same end of the bearing, means for lubricating both stuffing boxes and the bearing, and means for holding the glands and the bearing in the housing against rotation as the shaft revolves.

2. A combined bearing and multiple stuffing boxes comprising a tubular bearing terminating respectively at two separate stuffing boxes, said bearing provided with an axial oil groove on its inside diameter, an external, concentric sleeve encircling and defining two separate stuffing box areas, a separate gland for each stuffing box adjustable independently of each other, and a housing for supporting the co-operating parts.

3. In a shaft having reciprocating or rotary motion, a supporting continuous, concentric casing therefore, two separate stuffing boxes in spaced apart relation encircling the shaft, a bearing between the boxes, a lengthwise inner oil groove in the bearing, an outer sleeve encircling the parts, an oil chamber within the sleeve, connections from the chamber through radial openings in the bearing to the axial grooves on the inside of the bearing, a stuffing box gland for each stuffing box adjustable from the same end independently of each other, a housing for the parts, and means for continuously supplying lubricant to the shaft.

4. A tubular unitary bearing combined with a stuffing box at each end of the bearing, a shaft within the bearing, a housing for supporting the shaft, the bearing, and the stuffing boxes, and their glands, a tubular gland for each stuffing box, means associated with one of the glands for holding the parts against movement with the shaft, a lengthwise groove on the inner surface of the bearing, an annular oil chamber surrounding the glands, communicating passages from the chamber to the inside groove of the bearing, and means for holding all the parts assembled against rotation with the shaft.

5. A supporting housing, a tubular bearing supported by the housing, a shaft operable in the bearing, a stuffing box surrounding the shaft at each end of the bearing, a separate gland for each stuffing box, means for moving the glands lengthwise of the bearing, and concentric therewith, means for holding the parts against movement as the shaft is actuated, and means for storing lubricant to supply the bearing and the stuffing boxes.

6. A self-lubricating bearing unit which comprises a shaft operable in the unit, a separate packing box at each end of the bearing, separate glands for independently adjusting the packing of said boxes, said adjusting means being parallel with and concentric to the shaft, a tubular bearing having its ends terminating in and forming an end wall of the respective boxes against which the packing is compressed by the separate glands, a single source of lubrication for both boxes and the bearing, a housing for supporting the separate parts, means for preventing movement of the boxes and the bearing with the rotation of the shaft.

ERIC A. F. PRESSER.

REFERENCES CITED

The following references are of record in the file of this patent:

UNITED STATES PATENTS

| Number | Name | Date |
| --- | --- | --- |
| 313,180 | Colwell | Mar. 3, 1885 |
| 323,750 | Stitzel | Aug. 4, 1885 |
| 450,518 | Mayer | Apr. 14, 1891 |
| 691,893 | Butler | Jan. 28, 1902 |
| 731,228 | Rush | June 16, 1903 |
| 1,235,470 | Haynie | July 31, 1917 |
| 1,507,575 | Brouse | Sept. 9, 1924 |